(12) United States Patent
Yano et al.

(10) Patent No.: US 6,927,821 B2
(45) Date of Patent: Aug. 9, 2005

(54) OPTICALLY COMPENSATORY POLARIZER AND LIQUID-CRYSTAL DISPLAY DEVICE

(75) Inventors: Shuuji Yano, Ibaraki (JP); Seiji Umemoto, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 152 days.

(21) Appl. No.: 10/084,054

(22) Filed: Feb. 28, 2002

(65) Prior Publication Data

US 2002/0149726 A1 Oct. 17, 2002

(30) Foreign Application Priority Data

Mar. 1, 2001 (JP) ..................................... P2001-056323

(51) Int. Cl.⁷ ............................................ G02F 1/1335
(52) U.S. Cl. ....................... 349/117; 349/118; 349/119; 349/120
(58) Field of Search ................................ 349/117–120

(56) References Cited

U.S. PATENT DOCUMENTS 5,245,456 A * 9/1993 Yoshimi et al. ............. 349/118
6,320,042 B1 * 11/2001 Michihata et al. ............ 536/69
2003/0049459 A1 * 3/2003 Ishii et al. ................ 428/423.1

OTHER PUBLICATIONS

Improvement of Polarizer and Retardation Film for LCDS Aug., 31, 1992.

* cited by examiner

*Primary Examiner*—Tarifur R. Chowdhury
*Assistant Examiner*—George Y. Wang
(74) *Attorney, Agent, or Firm*—Sughrue Mion, PLLC

(57) ABSTRACT

An optically compensatory polarizer has a polarizer and an optically compensating film. The polarizer includes an absorption type polarizing element and transparent protective layers provided on opposite sides of the absorption type polarizing element, each of the transparent protective layers exhibiting an in-plane retardation of not larger than 10 nm and a thicknesswise retardation in a range of from 30 to 70 nm. The optically compensating film is laminated on one or each of opposite surfaces of the polarizer so that a slow axis of each optically compensating film crosses an absorption axis of the polarizer perpendicularly, and exhibits an in-plane retardation in a range of from 80 to 200 nm and $Nz=(nx-nz)/(nx-ny)$ in a range of from −0.2 to 0.2 and $nx$ and $ny$ satisfy the relation $nx>ny$.

2 Claims, 1 Drawing Sheet

OPTICALLY COMPENSATORY POLARIZER AND LIQUID-CRYSTAL DISPLAY DEVICE

The present application is based on Japanese Patent Application No. 2001-056323, which is incorporated herein by reference.

BACKGROUND OF THE INVENTION

1. Field of the Invention

The present invention relates to an optically compensatory polarizer for use in forming a liquid-crystal display device excellent in contrast and easy to view with a wide viewing angle but without being discolored.

2. Description of the Related Art

An optically compensatory polarizer has been heretofore known ("Improvement of Polarizer and Retardation Film for LCDs", Display and Imaging, 1993, Vol. 1, pp.257–264). The optically compensatory polarizer is produced as follows. Iodine or a dichromatic substance such as dichromatic dye is adsorbed to a polyvinyl alcohol film. The film is then drawn. Protective layers of triacetyl cellulose or the like are provided on opposite surfaces of the film to thereby prepare a polarizer. An optically compensating film having birefringence is laminated on the polarizer to thereby complete the production of the optically compensatory polarizer. When two optically compensatory polarizers produced in such a manner are arranged in the form of crossed-Nicol, it is possible to prevent light leakage at a wide viewing angle.

That is, even in the case where light transmission in a direction of a line normal to each of polarizers arranged in the form of crossed-Nicol is suppressed to achieve transmittance of about 0% between the polarizers, there is still a problem that gradual increase of light leakage with increase of the oblique viewing angle may make it impossible to achieve such transmittance of 0% because the apparent angle of an axis is out of perpendicularity when viewing is made from an oblique direction at an azimuth shifted from a direction of an optical axis. The arrangement of such polarizers in the form of crossed-Nicol is a method for achieving black display in a liquid-crystal display device. However, when viewing is made in an oblique direction, use of such polarizers in a liquid-crystal display device causes reduction of contrast to thereby result in reduction in visibility. Optically compensatory polarizers are therefore provided to prevent such light leakage. The background-art optically compensatory polarizer, however, has a problem that light transmitted through the optically compensatory polarizer is discolored.

SUMMARY OF THE INVENTION

The present inventors have made eager investigations into the discoloration problem. As a result, it has been proved that light with only a predetermined wavelength can reduce the oblique-direction transmittance of the background-art optically compensatory polarizer to about 0% but light with the other wavelengths makes the optically compensatory polarizing film exhibit wavelength dispersion to make the retardation vary in accordance with the wavelength so that transmittance increases to cause discoloration as the wavelength becomes far from the predetermined wavelength.

Therefore, an object of the invention is to develop optically compensatory polarizers in which light leakage and discoloration little occur even in the case where the optically compensatory polarizers are arranged in the form of crossed-Nicol and viewed obliquely at an azimuth shifted from an optical axis.

According to the invention, there is provided an optically compensatory polarizer having: a polarizer including an absorption type polarizing element, and transparent protective layers provided on opposite sides of the absorption type polarizing element, each of the transparent protective layers exhibiting an in-plane retardation of not larger than 10 nm and a thicknesswise retardation in a range of from 30 to 70 nm; and one optically compensating film laminated on one or each of opposite surfaces of the polarizer so that a slow axis of each optically compensating film crosses an absorption axis of the polarizer perpendicularly, the optically compensating film exhibiting an in-plane retardation in a range of from 80 to 200 nm and $Nz=(nx-nz)/(nx-ny)$ in a range of from −0.2 to 0.2 in which nz is a refractive index in a direction of a Z axis expressing a direction of the thickness of the optically compensating film, nx is a refractive index in a direction of an X axis expressing a direction of the optically compensating film in a sheet plane perpendicular to the Z axis, ny is a refractive index in a direction of a Y axis expressing a direction of the optically compensating film perpendicular both to the Z axis and to the X axis, and nx and ny satisfy the relation $nx>ny$. Further, there is provided a liquid-crystal display device having: a liquid-crystal cell; and one optically compensatory polarizer defined above and provided on one or each of opposite surfaces of the liquid-crystal cell.

According to the invention, the relation in optical axis between the polarizer and the optically compensating film and the respective specific optical properties such as retardation of the transparent protective layer and retardation of the optically compensating film are provided as described above. Hence, an optically compensatory polarizer can be obtained so that discoloration caused by light leakage can be suppressed because the optically compensatory polarizer is hardly affected by wavelength dispersion. When such optically compensatory polarizers are arranged in the form of crossed-Nicol, it is possible to reduce light leakage at an azimuth oblique to the direction of the optical axis of the polarizer as well as at an azimuth in the direction of the optical axis of the polarizer. In addition, the optically compensatory polarizers can be provided as polarizers little in discoloration caused by light leakage. When the optically compensatory polarizer is used, it is possible to form a liquid-crystal display device having a wide viewing angle and excellent both in contrast and in display quality.

Features and advantages of the invention will be evident from the following detailed description of the preferred embodiments described in conjunction with the attached drawings.

DETAILED DESCRIPTION OF THE PREFERRED EMBODIMENTS

Figure 1:
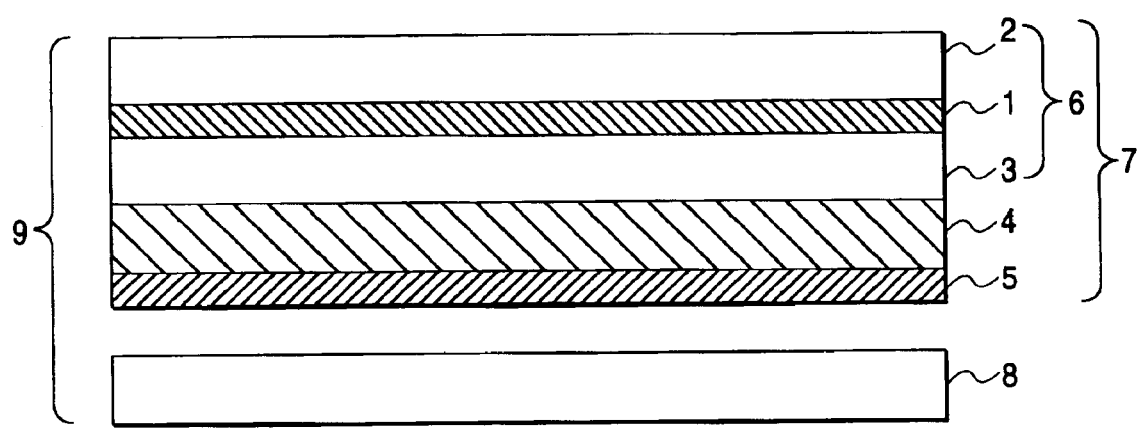
FIG. 1 is a view for explaining an embodiment of the invention.

An optically compensatory polarizer according to the invention has a polarizer, and one or two optically compensating films laminated on one or both of opposite surfaces of the polarizer so that a slow axis of each optically compensating film crosses an absorption axis of the polarizer perpendicularly. The polarizer includes an absorption type polarizing element, and two transparent protective layers provided on opposite surfaces of the absorption type polarizing element. Each of the transparent protective layers exhibits an in-plane retardation of not larger than 10 nm and a thicknesswise retardation in a range of from 30 to 70 nm. The optically compensating film exhibits an in-plane retardation in a range of from 80 to 200 nm and Nz in a range of from −0.2 to 0.2. FIG. 1 shows an example of the optically compensatory polarizer. In FIG. 1, an optically compensatory polarizer 7 includes an absorption type polarizing element 1, transparent protective layers 2 and 3, an optically compensating film 4, and an adhesive layer 5 provided as occasion demands. A polarizer 6 includes the absorption type polarizing element 1, and the transparent protective layers 2 and 3.

In the description, the in-plane retardation, the thicknesswise retardation and Nz are defined as $(nx-ny) \cdot d$, $\{(nx+ny)/2-nz\} \cdot d$ and $(nx-nz)/(nx-ny)$ respectively when nz is a refractive index in a direction of a Z axis expressing a direction of the thickness of the optically compensating film, nx is a refractive index in a direction of an X axis expressing a direction of the optically compensating film in a sheet plane perpendicular to the Z axis, ny is a refractive index in a direction of a Y axis expressing a direction of the optically compensating film perpendicular both to the Z axis and to the X axis, $\underline{d}$ is a thickness of each transparent protective film or each optically compensating film, and nx and ny satisfy the relation nx>ny.

Any suitable material can be used as the absorption type polarizing element if the material can exhibit characteristic capable of transmitting linearly polarized light but absorbing polarized light in a direction perpendicular to the linearly polarized light when natural light is incident on the material. A material which is excellent in the degree of polarization and good in transmittance so that transmitted light can be obtained sufficiently can be preferably used as the absorption type polarizing element. Examples of the material include a film obtained by adsorbing iodine or a dichromatic substance such dichromatic dye to a hydrophilic polymer film and drawing the film, and a polyene-oriented film such as an anhydrated polyvinyl alcohol film or a dehydrochlorinated polyvinyl chloride film.

Such a polarizing film is preferred from the point of view of handling properties due to reduction in thickness and increase in flexibility. From the point of view of obtaining linearly polarized light in a wide wavelength range such as a visible light range, it can be preferably used a film obtained by impregnating a polyvinyl alcohol film of a polymer such as polyvinyl alcohol or formalized polyvinyl alcohol with iodine or/and dichromatic dye such as azo dye, anthraquinone dye or tetrazine dye by a suitable method such as an adsorbing method and drawing/orienting the film. Especially, a uniaxially drawn film can be preferably used.

As shown in FIG. 1, the transparent protective layers 2 and 3 provided on opposite surfaces of the absorption type polarizing element 1 are provided to protect the absorption type polarizing element 1. Each of the transparent protective layers 2 and 3 is constituted by a transparent layer exhibiting an in-plane retardation of not larger than 10 nm and a thicknesswise retardation in a range of from 30 to 70 nm. The transparent layer preferably used exhibits an in-plane retardation of not larger than 8 nm, particularly not larger than 5 nm, and a thicknesswise retardation in a range of from 35 to 60 nm, especially in a range of from 40 to 50 nm.

Any suitable transparent material can be used for forming the transparent protective layers without any particular limitation. A polymer may be generally used as the transparent material. A polymer excellent in transparency may be preferably used. In addition, a transparent material small in photoelastic coefficient is preferable from the point of view of suppressing the change in retardation because of generation of stress. Examples of the polymer include: polycarbonate; polyallylate; polysulfone; polyolefin such as polypropylene; polyester such as polyethylene terephthalate or polyethylene naphthalate; polyvinyl alcohol polymer; norbornene polymer; acrylic polymer; styrene polymer; cellulose polymer; and a mixture of two or three or more kinds of polymers selected from these polymers.

Each of the transparent protective films can be formed by a suitable method such as a method of lamination of a transparent film through an adhesive agent, a method of extrusion lamination of a film or a method of application and solidification of polymer liquid. The in-plane retardation and the thicknesswise retardation in the transparent protective layer can be controlled in a process of formation of the layer or in a process of production of a film for forming the layer. Alternatively, the retardations may be controlled by a method in which internal distortion is reduced by heating after the formation of the layer.

The optically compensatory polarizer can be formed as shown in FIG. 1. That is, an optically compensating film 4 exhibiting an in-plane retardation in a range of from 80 to 200 nm and Nz in a range of from −0.2 to 0.2 is laminated on one or each of opposite surfaces of the polarizer so that a slow axis of the optically compensating film 4 crosses an absorption axis of the polarizer perpendicularly. Thus, the optically compensatory polarizer is produced. The optically compensating film used preferably exhibits an in-plane retardation in a range of from 100 to 160 nm, especially in a range of from 120 to 150 nm, and Nz in a range of from −0.1 to 0.1. An optically compensating film excellent in light transmittance and little both in orientation unevenness and in retardation unevenness maybe preferably used as the optically compensating film.

A suitable transparent material can be used for forming the optically compensating film without any particular limitation. A polymer may be generally used and a polymer excellent in transparency may be preferably used as the transparent material. From the point of view of suppressing the change in retardation due to generation of stress, a polymer having a small photoelastic coefficient may be preferably used. Examples of the polymer include materials listed above in the description of the transparent protective layer. The optically compensating film can be formed by a suitable method such as a method of drawing a polymer film, a method of application and solidification of polymer liquid or a method of combination of these methods. There is no particular limitation in the method of forming the optically compensating film.

A suitable drawing method such as a uniaxial drawing method or a biaxial drawing method can be used as the film drawing method for forming the optically compensating film. Generally, an optically compensating film exhibiting Nz of not larger than 0 or not smaller than 1 can be obtained by this drawing method. Incidentally, a method of controlling the thicknesswise refractive index of a polymer film by drawing the polymer film under the operation of shrinking force of a heat-shrinkable film bonded to the polymer film and heated, or a method of drawing a polymer film after obtaining the polymer film while controlling orientation of the polymer by applying an electric field to the polymer film in the direction of the thickness, maybe used for controlling the in-plane retardation and Nz. In this case, the retardation and Nz can be changed when the kind of the polymer for forming the film to be processed, the condition of drawing, the kind of the heat-shrinkable film, and the applied voltage are changed.

In the process of laminating the optically compensating film on the polarizer so that the slow axis of the optically compensating film crosses the absorption axis of the polarizer, it is preferable in terms of compensating effect that the two axes crosses each other as perpendicularly as possible though the two axes need not cross each other perfectly perpendicularly in terms of operating efficiency. In this case, the slow axis of the optically compensating film and the absorption axis of the polarizer are based on the view angle with respect to the frontal direction (azimuth angle: 0).

From the point of view of preventing displacement in optical axis and preventing foreign matter such as dust from entering, it is preferable that the optically compensating film is adhesively laminated on the polarizer. A suitable method such as a method of adhesion through a transparent adhesive layer can be used for the adhesive lamination. There is no particular limitation on the adhesive agent used for forming the adhesive layer. From the point of view of preventing respective optical properties of the optically compensating film and the polarizer from changing, an adhesive agent which can be hardened and dried without necessity of any high-temperature process can be used preferably and an adhesive agent not requiring any long-term hardening and drying process may be used preferably. In this respect, a tackifier or the like may be used preferably. Incidentally, the adhesive layer for bonding the optically compensating film and the polarizer to each other is not shown in FIG. 1.

A suitable polymer such as an acrylic polymer, a silicone polymer, a polyester polymer, a polyurethane polymer, polyether polymer or a synthetic rubber polymer can be used as the material of the tackifier. Especially, a tackifier made of an acrylic polymer may be preferably used from the point of view of optical transparency, tackiness, and weather resistance. Incidentally, the adhesive layer 5 as shown in FIG. 1, particularly the tacky layer may be provided on one or each of opposite surfaces of the optically compensatory polarizer as occasion demands for the purpose of bonding the optically compensatory polarizer to a subject such as a liquid-crystal cell. When the tacky layer is exposed on this occasion, the tacky layer may be preferably temporarily covered with a separator or the like to prevent the surface of the tacky layer from being contaminated until the tacky layer is put into practical use.

The optically compensatory polarizer according to the invention can be used for forming a liquid-crystal display device or for various purposes. In practical use of the optically compensatory polarizer, suitable optical layers such as a resin coating layer, a laminate layer of resin films, an anti-reflection layer and an anti-glare layer may be provided as occasion demands for suitable purposes of reinforcement, improvement in heat resistance, and improvement in moisture resistance.

As shown FIG. 1, the liquid-crystal display device 9 can be formed by arrangement of the optically compensatory polarizer 7 according to the invention in place of the background-art polarizer on one or each of opposite surfaces of a liquid-crystal cell 8. There is no particular limitation in the kind of the liquid-crystal cell and the method of driving the liquid-crystal cell. A suitable cell such as a TN liquid-crystal cell, a vertically aligned cell, an OCB cell or an IPS cell may be used as the liquid-crystal cell.

When the optically compensatory polarizer has one optically compensating film provided on only one surface of the polarizer and is to be disposed on the liquid-crystal cell, either of the polarizer and the optically compensating film may be disposed on the liquid-crystal cell side but it is generally preferable from the point of view of display quality that the optically compensating film is disposed on the liquid-crystal cell side. When optically compensatory polarizers are to be disposed on opposite surfaces of the liquid-crystal cell, the optically compensatory polarizers may be generally disposed in the form of crossed-Nicol (in which the axes of absorption of the optically compensatory polarizers cross each other perpendicularly). Incidentally, when the liquid-crystal display device is formed, various kinds of optical members such as a retarder plate, a light-diffusing plate, and a light-condensing sheet, which can be incorporated in the liquid-crystal display device, may be used as occasion demands or these optical members may be integrated with the optically compensatory polarizer as occasion demands.

EXAMPLE 1

After iodine was adsorbed to a polyvinyl alcohol film, the film was drawn to thereby prepare a polarizing film. Triacetyl cellulose films exhibiting an in-plane retardation of 8 nm and a thicknesswise retardation of 45 nm (with respect to light with a wavelength of 550 nm, this rule applies hereunder) were bonded to opposite surfaces of the polarizing film through an adhesive agent to thereby prepare a polarizer. An optically compensating film constituted by a biaxially drawn polycarbonate film and exhibiting an in-plane retardation of 140 nm and Nz of 0 was laminated on one of opposite surfaces of the polarizer through an adhesive agent so that a slow axis of the optically compensating film crossed an absorption axis of the polarizer perpendicularly. Thus, an optically compensatory polarizer was obtained.

COMPARATIVE EXAMPLE 1

An optically compensatory polarizer was obtained in the same manner as in Example 1 except that an uniaxially drawn polycarbonate film exhibiting an in-plane retardation of 350 nm and Nz of 1 was used as the optically compensating film and was laminated on the polarizer so that a slow axis of the optically compensating film was parallel to an absorption axis of the polarizer.

COMARATIVE EXAMPLE 2

A polarizer prepared in the same manner as in Example 1 was used alone without lamination of any optically compensating film thereon.

EVALUATION TEST

Two (optically compensatory) polarizers obtained in each of Example 1 and Comparative Examples 1 and 2 were stuck onto each other so that axes of absorption of the two plates crossed each other perpendicularly. Transmittance values with respect to light with wavelengths of 450 nm, 550 nm and 650 nm in a direction at an inclination angle of 70 degrees to a line normal to the two plates were measured in a direction at an azimuth angle of 45 degrees with respect to the optical axis of the two plates. Incidentally, in each of Example 1 and Comparative Example 1, the optically compensatory polarizers were stuck onto each other so that the optically compensating films faced each other.

Results of the measurement were as shown in the following Table.

|  | 450 nm | 550 nm | 650 nm |
|---|---|---|---|
| Example 1 | 0.1% | 0.1% | 0.5% |
| Comparative Example 1 | 1.3% | 0.5% | 2.4% |
| Comparative Example 2 | 3.0% | 3.7% | 3.7% |

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An optically compensatory polarizer comprising:

a polarizer including an absorption type polarizing element, and transparent protective layers provided on opposite sides of said absorption type polarizing element, each of said transparent protective layers exhibiting an in-plane retardation of not larger than 10 nm and a thicknesswise retardation in a range of from 30 to 70 nm; and at least one optically compensating film laminated on at least one of opposite surfaces of said polarizer so that a slow axis of each optically compensating film crosses an absorption axis of said polarizer perpendicularly, said optically compensating film exhibiting an in-plane retardation in a range of from 80 to 200 nm and Nz=(nx−nz)/(nx−ny) in a range of from −0.2 to 0.2 in which nz is a refractive index in a direction of a Z axis expressing a direction of the thickness of said optically compensating film, nx is a refractive index in a direction of an X axis expressing a direction of said optically compensating film in a sheet plane perpendicular to said Z axis, ny is a refractive index in a direction of a Y axis expressing a direction of said optically compensating film perpendicular both to said Z axis and to said X axis, and nx and ny satisfy the relation nx>ny.

2. A liquid-crystal display device comprising:

a liquid-crystal cell; and one optically compensatory polarizer according to claim 1 and provided on at least one of opposite surfaces of said liquid-crystal cell.

* * * * *